US012675232B2

(12) United States Patent　　(10) Patent No.:　US 12,675,232 B2
Liu et al.　　(45) Date of Patent:　Jul. 7, 2026

(54) MEMORY DIE FAMILY CLASSIFICATION METHOD

(71) Applicant: Micron Technology, Inc., Boise, ID (US)

(72) Inventors: Yang Liu, San Jose, CA (US); Zhenlei Shen, Milpitas, CA (US); Aaron Lee, Sunnyvale, CA (US)

(73) Assignee: Micron Technology, Inc., Boise, ID (US)

( * ) Notice: Subject to any disclaimer, the term of this patent is extended or adjusted under 35 U.S.C. 154(b) by 0 days.

(21) Appl. No.: 18/790,408

(22) Filed: Jul. 31, 2024

(65) Prior Publication Data

US 2026/0037172 A1　Feb. 5, 2026

(51) Int. Cl.
*G06F 3/06*　(2006.01)
(52) U.S. Cl.
CPC .......... *G06F 3/0653* (2013.01); *G06F 3/0604* (2013.01); *G06F 3/0679* (2013.01)
(58) Field of Classification Search
None
See application file for complete search history.

(56) References Cited

U.S. PATENT DOCUMENTS

2015/0113203 A1　4/2015　Dancho et al.
2016/0092116 A1*　3/2016　Liu ........................ G06F 3/0688
711/103

2017/0017588 A1　1/2017　Frid et al.
2022/0044737 A1*　2/2022　Khayat ................ G11C 11/5642
2022/0115079 A1*　4/2022　Sheperek ........... G11C 16/3422
2022/0155956 A1*　5/2022　Rayaprolu .......... G11C 11/5642
2022/0300156 A1*　9/2022　Park ......................... G06F 3/064
2022/0326851 A1*　10/2022　Nowell ................ G11C 16/349
2023/0103515 A1*　4/2023　Lee ....................... G06F 3/0616
711/103
2023/0115960 A1　4/2023　Sheperek et al.
2024/0231632 A1　7/2024　Kim

OTHER PUBLICATIONS

International Search Report and Written Opinion for International Application No. PCT/US2025/040207, mailed Nov. 9, 2025, 08 Pages.

* cited by examiner

*Primary Examiner* — Jared I Rutz
*Assistant Examiner* — Alexander J Yoon
(74) *Attorney, Agent, or Firm* — Lowenstein Sandler LLP

(57)　　ABSTRACT

Processing logic of a memory sub-system to measure a set of slow charge loss (SCL) values, wherein each SCL value of the set of slow charge loss values corresponds to a memory die of a set of memory dies of a memory sub-system. An ordered SCL index based on the set of SCL values is generated. Using a die family threshold level, a set of ranges of the ordered SCL index is identified. Each range of the set of ranges is assigned to a corresponding die family of a set of die families.

9 Claims, 5 Drawing Sheets

400

At a time-after-programming point, measure a set of slow charge loss (SCL) values corresponding to a set of memory dies
410

Generate an ordered SCL index based on the set of SCL values
420

Identify, using a die family threshold level, a set of ranges of the ordered SCL index
430

Assign each range of the set of ranges to a respective die family of a set of die families
440

MEMORY DIE FAMILY CLASSIFICATION METHOD

TECHNICAL FIELD

Embodiments of the disclosure relate generally to memory sub-systems, and more specifically, relate to a memory die family classification method associated with a set of memory dies in a memory sub-system.

BACKGROUND

A memory sub-system can include one or more memory devices that store data. The memory devices can be, for example, non-volatile memory devices and volatile memory devices. In general, a host system can utilize a memory sub-system to store data at the memory devices and to retrieve data from the memory devices.

BRIEF DESCRIPTION OF THE DRAWINGS

The present disclosure will be understood more fully from the detailed description given below and from the accompanying drawings of various embodiments of the disclosure.

DETAILED DESCRIPTION

Figure 1:
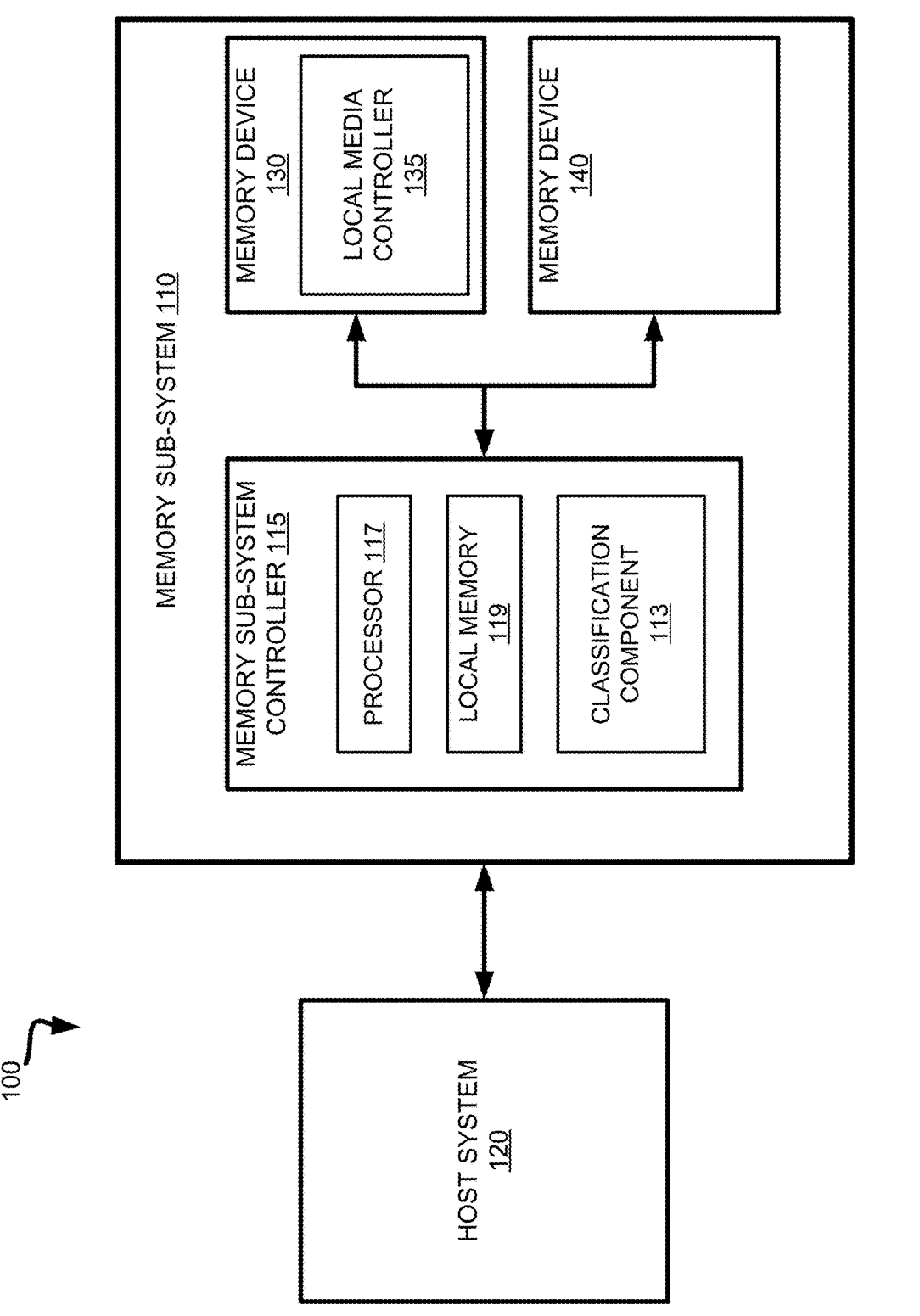
FIG. 1 illustrates an example computing system that includes a memory sub-system in accordance with one or more embodiments of the present disclosure.

Aspects of the present disclosure are directed to a memory die family classification method relating to a set of memory dies in a memory sub-system. A memory sub-system can be a storage device, a memory module, or a hybrid of a storage device and memory module. Examples of storage devices and memory modules are described below in conjunction with FIG. 1. In general, a host system can utilize a memory sub-system that includes one or more components, such as memory devices that store data. The host system can provide data to be stored at the memory sub-system and can request data to be retrieved from the memory sub-system.

A memory sub-system can include high density non-volatile memory devices where retention of data is desired when no power is supplied to the memory device. One example of non-volatile memory devices is a NOT-AND (NAND) memory device. Other examples of non-volatile memory devices are described below in conjunction with FIG. 1. A non-volatile memory device is a package of one or more dies. Each die can include two or more planes, such that each plane carries a matrix of memory cells formed onto a silicon wafer and joined by conductors referred to as wordlines and bitlines, such that a wordline joins multiple memory cells forming a row of the matric of memory cells, while a bitline joins multiple memory cells forming a column of the matric of memory cells. For some types of non-volatile memory devices (e.g., NAND devices), each plane consists of a set of physical blocks. A "block" herein refers to a set of contiguous or non-contiguous memory pages. An example of a block is an erasable block, which is a minimal erasable unit of memory, while a page is a minimal writable unit of memory. Each page includes a set of memory cells ("cells"). A cell is an electronic circuit that stores information. Depending on the cell type, each memory cell can store one or more bits of binary information, and has various logic states that correlate to the number of bits being stored. The logic states can be represented by binary values, such as "0" and "1", or combinations of such values. A set of memory cells referred to as a memory page can be programmed together in a single operation, e.g., by selecting consecutive bitlines.

The memory sub-system can perform host-initiated memory access operations. For example, the host system can initiate a data operation (e.g., write, read, erase, etc.) on a memory sub-system. The host system can send access requests (e.g., write command or read command) to the memory sub-system, such as to store data on a memory device at the memory sub-system and to read data from the memory device on the memory sub-system. The data to be read or written, as specified by a host request, is hereinafter referred to as "host data." A host request can include logical address information (e.g., logical block address (LBA), namespace) for the host data, which is the location the host system associates with the host data. The logical address information (e.g., LBA, namespace) can be part of metadata for the host data. Metadata can also include error handling data (e.g., ECC codeword, parity code), data version (e.g. used to distinguish age of data written), valid bitmap (which LBAs or logical transfer units contain valid data), etc.

A memory device includes multiple memory cells, each of which can store, depending on the memory cell type, one or more bits of information. A memory cell can be programmed (written to) by applying a certain voltage to the memory cell, which results in an electric charge being held by the memory cell, thus allowing modulation of the voltage distributions produced by the memory cell. Moreover, precisely controlling the amount of the electric charge stored by the memory cell allows to establish multiple threshold voltage levels corresponding to different logical levels, thus effectively allowing a single memory cell to store multiple bits of information: a memory cell operated with $2^s$ different threshold voltage levels is capable of storing n bits of information. Thus, the read operation can be performed by comparing the measured voltage exhibited by the memory cell to one or more reference voltage levels in order to distinguish between two logical levels for single-level cells and between multiple logical levels for multi-level cells.

Due to the phenomenon known as slow charge loss (SCL), the threshold voltage of a memory cell changes in time as the electric charge of the cell is degrading, also referred to as "temporal voltage shift" (since the degrading electric charge causes the voltage distributions to shift along the voltage axis towards lower voltage levels). The threshold voltage is changing rapidly at first (immediately after the memory cell was programmed), and then slows down in an approximately logarithmic linear fashion with respect to the time elapsed since the cell programming event. Accordingly, failure to mitigate the temporal voltage shift caused by the slow charge loss can result in the increased bit error rate in read operations.

A memory sub-system can mitigate the temporal voltage shift by employing block family based error avoidance strategies. The temporal voltage shift is selectively tracked for programmed blocks grouped by block families, and appropriate voltage offsets, which are based on block affiliation with a certain block family, are applied to the base read levels in order to perform read operations. "Block family" herein shall refer to a set of blocks that have been programmed within a specified time window and a specified temperature window. Since the time elapsed after programming and temperature are the main factors affecting the temporal voltage shift, all blocks and/or partitions within a single block family are presumed to exhibit similar distributions of threshold voltages in memory cells, and thus would require the same voltage offsets to be applied to the base read levels for read operations. "Base read level" herein shall refer to the initial threshold voltage level exhibited by the memory cell immediately after programming. In some implementations, base read levels may be stored in the metadata of the memory device.

Block family error avoidance (BFEA) is used in some memory devices to track slow charge loss (SCL) for programmed blocks and for selecting the appropriate voltage bin offset at read time. As part of the BFEA process or strategy, the memory sub-system controller can periodically perform a calibration process (also referred to as a calibration scan) in order to evaluate a data state metric (e.g., a bit error rate) and associate each block family with one of predefined time-after-programming (TAP) bins, which is in turn associated with the voltage offset to be applied for read operations. The bins can be numbered from 0 to 7 (e.g., bin 0-bin 7), and each bin can be associated with a voltage offset to be applied to a base read level for read operations. The associations of block families with TAP bins (e.g., bins 0-7) can be stored in respective metadata tables maintained by the memory sub-system controller.

For some memory devices, however, it may be difficult to track SCL for each superblock. Therefore, superblocks, with similar SCL progression profile are grouped together into a block family (BF). Each block family has a set of voltage bin offset assigned to it. However, assigning voltage bin offsets per memory die can be a time-consuming process since systems can include a large number of memory dies (e.g., hundreds of memory dies). Accordingly, each of the memory dies may first be grouped into different die families, prior to the BFEA process assigning a bin pointer to each die family.

As part of the BFEA bin assignment process, each of the memory die of the set of memory die of the memory sub-system is classified into a respective die family. One approach to classifying the memory dies into die families (e.g., N number of die families) includes measuring an SCL value for each memory die at a predefined TAP point of a set of TAP points. The range of measured SCL values is divided into N number of groups (i.e., N number of SCL groups) based on the SCL values. The system then assignees each die (i.e., a target die) into one of a respective die family based on the measured SCL value corresponding to the target die. For example, a first die family (e.g., DF 1) may be defined as including SCL values in a first range and any memory die having a measured SCL value in the first range is assigned to the first die family.

However, the aforementioned classification process results in the under-utilization of some die families. In particular, the set of memory dies in a drive are frequently classified unevenly, such that one or more die families may include a small number of members, while other die family contain most of the dies in the drive. This is the result of a large number of memory dies falling into a same SCL range (e.g., having SCL values that are close to one another).

In addition, classification of dies into die families based on the SCL measurements leads to inaccurate classifications due to the limited level of sampling (e.g., sampling a small number of dies to represent all of the dies in a die family) and measurement variations from block-to-block, wordline-to-wordline, and plane-to-plane. Furthermore, determining when to measure the SCL values (i.e., selecting the TAP times) and the temperature of the memory device is a key factor in capturing a die-to-die SCL relationship that can be used for classification. Accordingly, it is difficult to accurately classifying die into current die families for subsequent BFEA bin assignment based on the above-identified factors. Accordingly, noisy SCL measurements lead to the classifying of a large number of dies into one single die family, while other die family have zero or a small number of members.

Aspects of the present disclosure address the above-noted and other deficiencies by implementing a process to classify a set of memory die into respective die families based on a threshold percentage of SCL values. According to embodiments, an SCL value is measured for each memory die of the set of memory dies at predefined time-after-programming (TAP) times. An ordered index of the memory dies based on the measured SCL values (herein the "SCL index") is generated. In an embodiment, the ordered SCL index sorts the set of memory dies based on the measured SCL value (e.g., a memory die having a lowest SCL value is assigned SCL index value 0, a next lowest SCL value is assigned SCL index value 1, and so on until all memory die are assigned an SCL index value).

In an embodiment, a die family threshold level (e.g., a DF percentage) is established and used in classifying each memory die of a set memory dies into a respective die family of a set of die families (e.g., DF 1, DF 2 . . . . DF N). According to embodiments, the SCL index is segmented into multiple portions or ranges based on the DF threshold level. For example, using the DF threshold level (e.g., a percentage of the total number of memory dies to be classified) is applied to SCL index to identify multiple ranges of the SCL index. In an example, a first portion or range of the SCL index corresponding to the DF threshold level (e.g., a first 20% percent of the SCL index) is identified, a second portion or range of the SCL index corresponding to the DF threshold level (e.g., a second 20% of the SCL index) is identified, a third portion or range of the SCL index corresponding to the DF threshold level (e.g., a third 20% of the SCL index) is identified, a fourth portion or range of the SCL index corresponding to the DF threshold level (e.g., a fourth 20% of the SCL index) is identified, and a fifth portion or range of the SCL index corresponding to the DF threshold level (e.g., a fifth 20% of the SCL index) is identified.

According to embodiments, a first subset of memory dies corresponding to the first portion or range of the SCL index are assigned to a first die family (DF 1), a first subset of memory dies corresponding to the first portion or range of the SCL index are assigned to a first die family (DF 1), a second subset of memory dies corresponding to the first portion or range of the SCL index are assigned to a second die family (DF 2), a third subset of memory dies corresponding to the third portion or range of the SCL index are assigned to a third die family (DF 3), a fourth subset of memory dies corresponding to the fourth portion or range of the SCL index are assigned to a fourth die family (DF 4), and a fifth subset of memory dies corresponding to the fifth portion or range of the SCL index are assigned to a fifth die family (DF 5).

In an embodiment, the DF threshold level may be adjustable. In this embodiment, the DF threshold level can be adjusted based on a lifecycle-related parameter of the set of memory dies. In an embodiment, the DF threshold level can be adjusted or tuned based on a program/erase count (PEC) associated with the set of memory dies.

Advantageously, the memory dies can be classified into respective die families in a balanced manner. According to embodiments, based on measurements of the SCL values, an equal distribution of memory dies into respective die families can be implemented. According to embodiments, each die family includes an equal number of die members in accordance with the DF threshold level. Accurate and balanced die family assignment further enables improved BFEA bin assignment.

FIG. 1 illustrates an example computing system 100 that includes a memory sub-system 110 in accordance with some embodiments of the present disclosure. The memory sub-system 110 can include media, such as one or more volatile memory devices (e.g., memory device 140), one or more non-volatile memory devices (e.g., memory device 130), or a combination of such.

A memory sub-system 110 can be a storage device, a memory module, or a hybrid of a storage device and memory module. Examples of a storage device include a solid-state drive (SSD), a flash drive, a universal serial bus (USB) flash drive, an embedded Multi-Media Controller (eMMC) drive, a Universal Flash Storage (UFS) drive, a secure digital (SD) and a hard disk drive (HDD). Examples of memory modules include a dual in-line memory module (DIMM), a small outline DIMM (SO-DIMM), and various types of non-volatile dual in-line memory module (NVDIMM).

The computing system 100 can be a computing device such as a desktop computer, laptop computer, network server, mobile device, a vehicle (e.g., airplane, drone, train, automobile, or other conveyance), Internet of Things (IoT) enabled device, embedded computer (e.g., one included in a vehicle, industrial equipment, or a networked commercial device), or such computing device that includes memory and a processing device.

The computing system 100 can include a host system 120 that is coupled to one or more memory sub-systems 110. In some implementations, the host system 120 is coupled to different types of memory sub-system 110. FIG. 1 illustrates one example of a host system 120 coupled to one memory sub-system 110. As used herein, "coupled to" or "coupled with" generally refers to a connection between components, which can be an indirect communicative connection or direct communicative connection (e.g., without intervening components), whether wired or wireless, including connections such as electrical, optical, magnetic, etc.

The host system 120 can include a processor chipset and a software stack executed by the processor chipset. The processor chipset can include one or more cores, one or more caches, a memory controller (e.g., NVDIMM controller), and a storage protocol controller (e.g., PCIe controller, SATA controller). The host system 120 uses the memory sub-system 110, for example, to write data to the memory sub-system 110 and read data from the memory sub-system 110.

The host system 120 can be coupled to the memory sub-system 110 via a physical host interface. Examples of a physical host interface include, but are not limited to, a serial advanced technology attachment (SATA) interface, a peripheral component interconnect express (PCIe) interface, universal serial bus (USB) interface, Fibre Channel, Serial Attached SCSI (SAS), a double data rate (DDR) memory bus, Small Computer System Interface (SCSI), a dual in-line memory module (DIMM) interface (e.g., DIMM socket interface that supports Double Data Rate (DDR)), etc. The physical host interface can be used to transmit data between the host system 120 and the memory sub-system 110. The host system 120 can further utilize an NVM Express (NVMe) interface to access components (e.g., memory devices 130) when the memory sub-system 110 is coupled with the host system 120 by the physical host interface (e.g., PCIe bus). The physical host interface can provide an interface for passing control, address, data, and other signals between the memory sub-system 110 and the host system 120. FIG. 1 illustrates a memory sub-system 110 as an example. In general, the host system 120 can access multiple memory sub-systems via a same communication connection, multiple separate communication connections, and/or a combination of communication connections.

The memory devices 130, 140 can include any combination of the different types of non-volatile memory devices and/or volatile memory devices. The volatile memory devices (e.g., memory device 140) can be, but are not limited to, random access memory (RAM), such as dynamic random access memory (DRAM) and synchronous dynamic random access memory (SDRAM).

Some examples of non-volatile memory devices (e.g., memory device 130) include negative-and (NAND) type flash memory and write-in-place memory, such as a three-dimensional cross-point ("3D cross-point") memory device, which is a cross-point array of non-volatile memory cells. A cross-point array of non-volatile memory can perform bit storage based on a change of bulk resistance, in conjunction with a stackable cross-gridded data access array. Additionally, in contrast to many flash-based memories, cross-point non-volatile memory can perform a write in-place operation, where a non-volatile memory cell can be programmed without the non-volatile memory cell being previously erased. NAND type flash memory includes, for example, two-dimensional NAND (2D NAND) and three-dimensional NAND (3D NAND).

Each of the memory devices 130 can include one or more arrays of memory cells, such as memory array 137. One type of memory cell, for example, single level cells (SLC) can store one bit per cell. Other types of memory cells, such as multi-level cells (MLCs), triple level cells (TLCs), quad-level cells (QLCs), and penta-level cells (PLCs) can store multiple bits per cell. In some implementations, each of the memory devices 130 can include one or more arrays of memory cells such as SLCs, MLCs, TLCs, QLCs, or any combination of such. In some implementations, a particular memory device can include an SLC portion, and an MLC portion, a TLC portion, a QLC portion, or a PLC portion of memory cells. The memory cells of the memory devices 130 can be grouped as pages that can refer to a logical unit of the memory device used to store data. With some types of memory (e.g., NAND), pages can be grouped to form blocks.

Although non-volatile memory components such as 3D cross-point array of non-volatile memory cells and NAND type flash memory (e.g., 2D NAND, 3D NAND) are described, the memory device 130 can be based on any other type of non-volatile memory, such as read-only memory (ROM), phase change memory (PCM), self-selecting memory, other chalcogenide based memories, ferroelectric transistor random-access memory (FeTRAM), ferroelectric random access memory (FeRAM), magneto random access memory (MRAM), Spin Transfer Torque (STT)-MRAM, conductive bridging RAM (CBRAM), resistive random access memory (RRAM), oxide based RRAM (OxRAM), negative-or (NOR) flash memory, and electrically erasable programmable read-only memory (EEPROM).

A memory sub-system controller 115 (or controller 115 for simplicity) can communicate with the memory devices 130 to perform operations such as reading data, writing data, or erasing data at the memory devices 130 and other such operations. The memory sub-system controller 115 can include hardware such as one or more integrated circuits and/or discrete components, a buffer memory, or a combination thereof. The hardware can include a digital circuitry with dedicated (i.e., hard-coded) logic to perform the operations described herein. The memory sub-system controller 115 can be a microcontroller, special purpose logic circuitry (e.g., a field programmable gate array (FPGA), an application specific integrated circuit (ASIC), etc.), or other suitable processor.

The memory sub-system controller 115 can be a processing device, which includes one or more processors (e.g., processor 117), configured to execute instructions stored in a local memory 119. In the illustrated example, the local memory 119 of the memory sub-system controller 115 includes an embedded memory configured to store instructions for performing various processes, operations, logic flows, and routines that control operation of the memory sub-system 110, including handling communications between the memory sub-system 110 and the host system 120.

In some implementations, the local memory 119 can include memory registers storing memory pointers, fetched data, etc. The local memory 119 can also include read-only memory (ROM) for storing micro-code. While the example memory sub-system 110 in FIG. 1 has been illustrated as including the memory sub-system controller 115, in another embodiment of the present disclosure, a memory sub-system 110 does not include a memory sub-system controller 115, and can instead rely upon external control (e.g., provided by an external host, or by a processor or controller separate from the memory sub-system).

In general, the memory sub-system controller 115 can receive commands or operations from the host system 120 and can convert the commands or operations into instructions or appropriate commands to achieve the desired access to the memory devices 130. The memory sub-system controller 115 can be responsible for other operations such as wear leveling operations, garbage collection operations, error detection and error-correcting code (ECC) operations, encryption operations, caching operations, and address translations between a logical address (e.g., logical block address (LBA), namespace) and a physical address (e.g., physical block address) that are associated with the memory devices 130. The memory sub-system controller 115 can further include host interface circuitry to communicate with the host system 120 via the physical host interface. The host interface circuitry can convert the commands received from the host system into command instructions to access the memory devices 130 as well as convert responses associated with the memory devices 130 into information for the host system 120.

The memory sub-system 110 can also include additional circuitry or components that are not illustrated. In some implementations, the memory sub-system 110 can include a cache or buffer (e.g., DRAM) and address circuitry (e.g., a row decoder and a column decoder) that can receive an address from the memory sub-system controller 115 and decode the address to access the memory devices 130.

In some implementations, the memory devices 130 include local media controller 132 that operate in conjunction with memory sub-system controller 115 to execute operations on one or more memory cells of the memory devices 130. An external controller (e.g., memory sub-system controller 115) can externally manage the memory device 130 (e.g., perform media management operations on the memory device 130). In some implementations, a memory device 130 is a managed memory device, which is a raw memory device combined with a local controller (e.g., local controller 132) for media management within the same memory device package. An example of a managed memory device is a managed NAND (MNAND) device.

The memory sub-system 110 includes classification component 113 to classify memory dies into die families based on a sorted index of slow charge loss (SCL) values and a die family threshold level (e.g., a die family percentage). According to embodiments, the classification component 113 may execute a BFEA process to assign bin pointers to each of the die family in accordance with a BFEA strategy. In some implementations, the memory sub-system controller 115 includes at least a portion of the classification component 113. In some implementations, the classification component 113 is part of the host system 110, an application, or an operating system. In other embodiments, local media controller 135 includes at least a portion of the classification component 113 and is configured to perform the functionality described herein.

According to embodiments, the classification component 113 measures an SCL value for each memory die of the set of memory dies at predefined time-after-programming (TAP) times. The classification component 113 generates and stores an ordered index of the memory dies based on the measured SCL values (herein the "SCL index") is generated. In an embodiment, the ordered SCL index sorts the set of memory dies based on the measured SCL value (e.g., a memory die having a lowest SCL value is assigned SCL index value 0, a next lowest SCL value is assigned SCL index value 1, and so on until all memory die are assigned an SCL index value). In an embodiment, the ordered SCL index includes the memory die sorted based on the corresponding measured SCL value, ranging from a memory die having a lowest measured SCL value that is assigned SCL index value 0 to a memory die having a highest measured SCL value that is assigned SCL index value Z.

In an embodiment, the classification component 113 applies the die family (DF) threshold level (e.g., a DF percentage) to the ordered SCL index to identify equal portions of the index to assign to each of the respective die family of a set of die families (e.g., DF 1, DF 2 . . . . DF N). According to embodiments, the classification component 113 divides or segments the ordered SCL index into equal portions or percentages according to the DF threshold level.

For example, for a system having N die families, the DF threshold is set to 100%/N). In an embodiment, the classification component 113 identifies a first portion or range of SCL index values equal to the DF threshold level (e.g., a first 100%/N of the SCL index values) and assigns the first portion of the range (e.g., SCL index value 0 to SCL index value A) to a first die family (e.g., DF 1). In an embodiment, the classification component 113 identifies a second portion or range of SCL index values equal to the DF threshold level (e.g., a second 100%/N of the SCL index values) and assigns the second portion of the range (e.g., SCL index value A+1 to SCL index value B) to a second die family (e.g., DF 2). The classification component 113 continues this process to identify respective portions or ranges of the SCL index equal to the DF threshold level (e.g., a third portion or range SCL index values, a fourth portion or range of SCL index values . . . an Nth portion or range of SCL index values) to assign to the remaining DF families (e.g., DF 3, DF 4, . . . . DF N).

Advantageously, the classification component 113 assigns the entire set of memory dies in equal portions to the respective set of die families using the DF threshold level. This results in die families that each have an equal number of assigned member dies, which eliminates the formation of under-utilized and over-utilized die families. The classification component 113 enables the formation of equal-sized die families, which results in improved BFEA processing.

In an embodiment, the classification component 113 adjusts or changes the DF threshold level for one or more die families during a runtime of the memory sub-system including the set of memory dies. In an embodiment, the classification component 113 adjusts the DF threshold level based on a lifecycle-related parameter of the set of memory dies. In an embodiment, the DF threshold level can be adjusted or tuned based on a program/erase count (PEC) associated with the set of memory dies. For example, the classification component 113 can determine that the PEC associated with the memory dies satisfies a condition (e.g., the PEC reaches a first threshold level) and adjusts the DF threshold level from a first value (e.g., 100%/N) of the SCL index range to a second value (e.g., 100%/P) of the SCL index range for one or more of the die families. For example, in response to the PEC satisfying a condition, the classification component 113 can set the DF threshold level to 100%/P for assigning members to die families 1 and 2, and set the DF threshold level to 100%/Q for assigning members to die families 3 to N, where the adjusted DF threshold levels result in the assignment of all of the memory dies to respective die families (e.g., 100%/P assigned to DF 1+100%/P assigned to DF 2+100%/Q assigned to DF 3+ . . . 100%/Q assigned to N equals 100% of the set of memory dies arranged in the ordered SCL index). Further details regarding the operations of the classification component 113 are described below.

Figure 2:
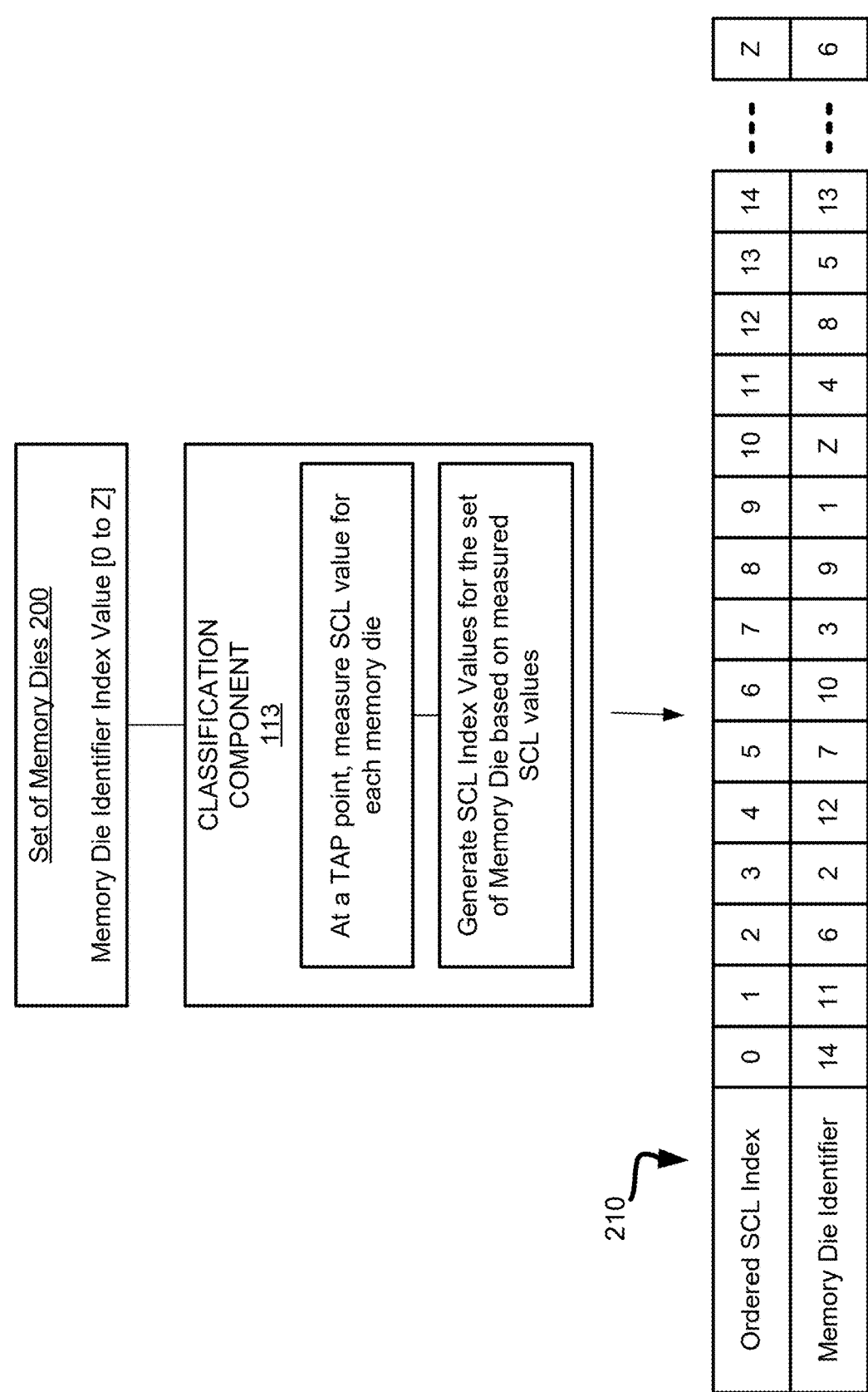
FIG. 2 illustrates example processing logic of a memory sub-system controller to perform operations associated with assigning each memory die of a set of memory dies of a memory sub-system to a respective die family based on ordered index of measured slow charge loss (SCL) values and a die family threshold level, in accordance with one or more embodiments of the present disclosure.

FIG. 2 illustrates example processing logic (e.g., classification component 113) of a memory sub-system controller (e.g., memory sub-system controller 115 of FIG. 1) to perform operations associated with assigning each memory die of a set of memory dies 200 of a memory sub-system (e.g., memory sub-system 110 of FIG. 1) to a respective die family based on a measured slow charge loss (SCL) value and a die family threshold level. In an embodiment, the classification component 113 generates the die family assignment as part of a BFEA process used to track SCL for programmed blocks and for selecting the appropriate voltage bin offset at read time. The classification component 113 can perform a calibration process (also referred to as a calibration scan) at predetermined time-after-programming (TAP) points or intervals in order to associate each block family (e.g., a superblock of memory blocks having similar SCL progression profiles that are grouped together) with one of predefined time-after-programming (TAP) bins, which is in turn associated with the voltage offset to be applied for read operations. According to embodiments, each block family has a set of voltage bin offset assigned to it.

According to embodiments, to further optimize the BFEA process, in advance of the aforementioned bin assignment, the classification component 113 classifies each of the memory die of the set of memory dies 200 of the memory sub-system into a respective die family. As shown in FIG. 2, the set of memory dies 200 includes memory die having an identifier index value. For example, each memory die is associated with an identifier index value which identifies the respective memory die (e.g., memory die identifier index value in a range of 0 to Z).

According to embodiments, at a first time-after-programming (TAP) interval (also referred to as a "TAP point"), the classification component 113 measures a SCL value for each of the memory die of the set of memory dies. The classification component 113 generates an ordered SCL index based on the measured SCL values. According to embodiments, the ordered SCL index ranges from a lowest measured SCL value (SCL index value 0) to a highest measured SCL value (SCL index value Z) corresponding to the set of memory dies. In an embodiment, the classification component 113 generates a data structure 200 storing the ordered SCL index associated with the corresponding memory die identifier. As shown in FIG. 2, the data structure 200 includes the memory die identifier for each die as sorted by a corresponding SCL index value representing a measured SCL value ranging from a lowest measured SCL value to a highest measured SCL value.

In the example shown in FIG. 2, memory die identifier 14 is determined to have a lowest measured SCL value (as measured at a TAP point of a set of TAP points) and is assigned SCL index value 0, memory die identifier 11 is determine to a next lowest measured SCL value and is assigned SCL index value 1, and so on until memory die identifier 6 is determined to have the highest measured SCL value and is assigned SCL index value Z. In an embodiment, if the classification component 113 determines that two (or more) memory die (e.g., memory die identifier 7 and memory die identifier 10 in the example shown in FIG. 2) have a same measured SCL value, the classification component 113 can assign the memory die having the lower memory die identifier value (e.g., memory die identifier 7) to the lower SCL index value (e.g., SCL index value 5) and assign the higher memory die identifier value (e.g., memory die identifier 10) to the higher SCL index value (e.g., SCL index value 6).

According to embodiments, the classification component 113 can perform the above-described operations at each TAP point of a set of TAP points. Accordingly, at each TAP point, the classification component 113 can measure an updated SCL value for each memory die of the set of memory dies 200 and generate an updated ordered SCL index based on the updated measurements.

Figure 3:
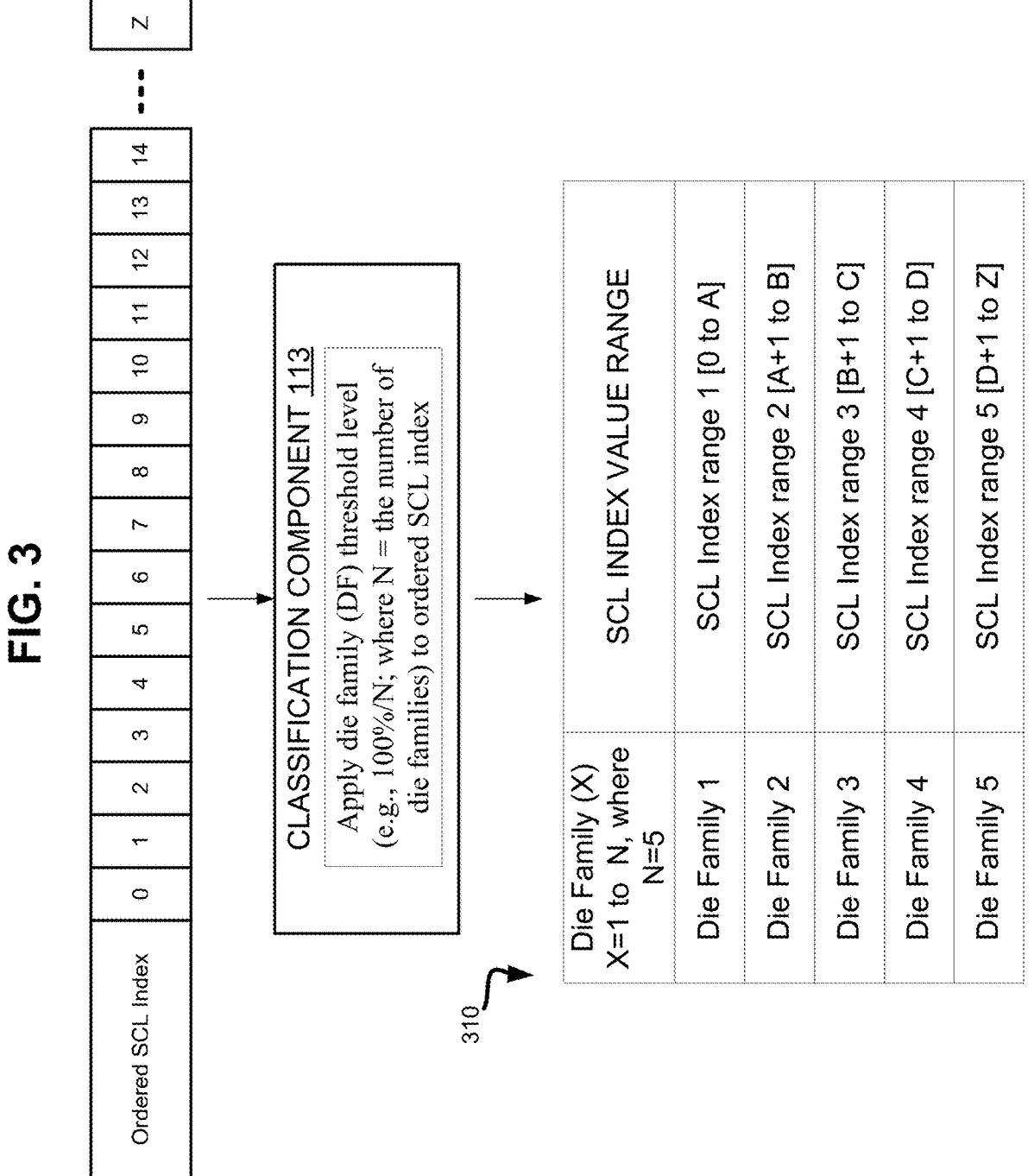
FIG. 3 illustrates example processing logic assigning each range of a set of ranges of memory dies to a respective die family based on applying a die family threshold level to an ordered index of SCL values, in accordance with one or more embodiments of the present disclosure.

FIG. 3 illustrates example processing logic (e.g., classification component 113) of a memory sub-system controller (e.g., memory sub-system controller 115 of FIG. 1) to perform operations to assign or group each memory die of the set of memory dies (e.g., classification component 113 into a die family and based on the measured SCL value and a die family threshold level. In the example shown in FIG. 3, the set of die families includes N number of die families, where N equals 5 (e.g., Die Family 1, Die Family 2, Die Family 3, Die Family 4, and Die Family 5).

According to embodiments, the classification component 113 applies the die family (DF) threshold level to the ordered SCL index to identify groups or portions of the set of memory dies to assign to each respective die family (e.g., DF 1 to DF 5). In an embodiment, the DF threshold level represents a percentage of the total ordered SCL index to assign to each die family. In an embodiment, the DF threshold level is represented by the following expression:

$$DF \text{ threshold level} = 100\%/N; \text{ where } N \text{ equals the number of die families}$$

In the example shown in FIG. 3 where N equals 5, the DF threshold level is 100%/5 or 20%. In this example, each die family is assigned 20% of the ordered SCL index, as shown in the example data structure 301. In an embodiment, as shown in data structure 301, a first range of the ordered SCL index equal to 20% (e.g., SCL index range 1) is assigned to DF 1, a second range of the ordered SCL index equal to 20% (e.g., SCL index range 2) is assigned to DF 2, a third range of the ordered SCL index equal to 20% (e.g., SCL index range 3) is assigned to DF 3, a fourth range of the ordered SCL index equal to 20% (e.g., SCL index range 4) is assigned to DF 4, and a fifth range of the ordered SCL index equal to 20% (e.g., SCL index range 5) is assigned to DF 5. In the example shown in FIG. 3, the classification component 113 determines that SCL index range 1 includes the first 100%/N (e.g., 20%) of the ordered SCL index (e.g., SCL index value 0 to A), SCL index range 2 includes the second 20% of the ordered SCL index (e.g., SCL index value A+1 to B), SCL index range 3 includes the third 20% of the ordered SCL index (e.g., SCL index value B+1 to C), SCL index range 4 includes the fourth 20% of the ordered SCL index (e.g., SCL index value C+1 to D), and SCL index range 5 includes the fifth (and final) 20% of the ordered SCL index (e.g., SCL index value D+1 to Z).

For example, the SCL index value Z (i.e., the last index value of the ordered SCL index ranging from 0 to Z) may be equal to 99. Accordingly, the SCL index represents a range of 100 memory dies in the set of memory dies that are sorted by a corresponding measured SCL value. In this example, SCL index range 1 including SCL index values [0 to 19] is assigned to DF 1, SCL index range 2 including SCL index values [20 to 39] is assigned to DF 2, SCL index range 3 including SCL index values [40 to 59] is assigned to DF 3, SCL index range 4 including SCL index values [60 to 79] is assigned to DF 4, and SCL index range 5 including SCL index values [80 to 99] is assigned to DF 5.

Advantageously, as illustrated in FIG. 3, the classification component 113 assigns each memory die to a respective die family based on both a measured SCL value and the DF threshold level. In addition, as shown in the example of FIG. 3, applying an example DF threshold level of 100%/N, where N equals the number of die families, an equal number of memory dies are assigned to each of the respective die families.

According to embodiments, as described above with reference to FIG. 2, the classification component 113 can perform the operations described with reference to FIG. 3 at each TAP point of a set of TAP points. Accordingly, at each TAP point, the classification component 113 can apply the DF threshold level to the updated SCL index value to update the assignment of the memory dies to the die families.

In an embodiment, the classification component 113 can adjust or update the DF threshold level during a lifecycle of the set of memory dies based on a lifecycle-related parameter. In an embodiment, based on a lifecycle-related parameter (e.g., a program/erase count (PEC)) satisfying a condition, the classification component 113 can cause an adjustment to the DF threshold level on a per die family basis (e.g., set a DF threshold level for each of the die families). In an embodiment, the one or more adjusted DF threshold levels are applied to the ordered SCL index. In an embodiment, when the PEC value reaches a threshold level (e.g., a PEC threshold level or count), the classification component 113 may adjust the DF threshold level applied to assign one or more ranges of the ordered SCL index.

In an example, the classification component 113 can determine that a current PEC value satisfies a condition (e.g., the current PEC value reached a threshold value), and in response, adjust a first DF threshold level used to assign dies to a first die family to 100%/A, adjust a second DF threshold level used to assign dies to a second die family to 100%/B, adjust a third DF threshold level used to assign dies to a third die family to 100%/C, adjust a fourth DF threshold level used to assign dies to a fourth die family to 100%/D, and adjust a fifth DF threshold level used to assign dies to a fifth die family to 100%/E. For example, the adjusted DF threshold levels can be established such that the classification component 113 assigns 10% of the ordered SCL index to die family 1, 15% of the ordered SCL index to die family 2, 15% of the ordered SCL index to die family 3, 30% of the ordered SCL index to die family 4, and 30% of the ordered SCL index to die family 5.

Figure 4:
FIG. 4 depicts a flow diagram of an example method of assigning each memory die of a set of memory dies to a respective die family of a set of die families based on a measured SCL value and a die family threshold level, in accordance with some embodiments of the present disclosure.
Figure 4:
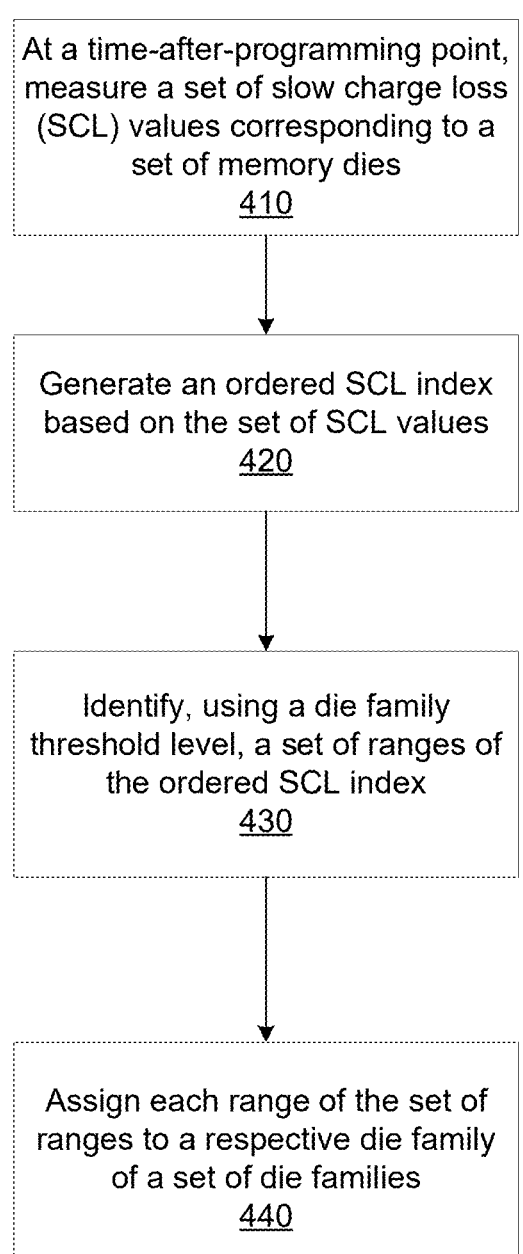

FIG. 4 is a flow diagram of an example method 400 of assigning each memory die of a set of memory dies to a respective die family of a set of die families based on a measured SCL value and a die family threshold level, in accordance with some embodiments of the present disclosure. The method 400 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some implementations, the method 400 is performed by classification component 113 of FIGS. 1-3. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At operation 410, at a time-after-programming (TAP) point, the processing logic measures a set of SCL values corresponding to a set of memory dies of a memory subsystem. In an embodiment, each TAP point of a set of TAP points, the processing logic measures an SCL value for each memory die of the set of memory dies.

At operation 420, the processing logic generates an ordered SCL index based on the set of SCL values. In an embodiment, the ordered SCL index includes a sequence of the measured SCL values associated with the set of memory dies ranging from a lowest measured SCL value to a highest measured SCL value. For example, the SCL index can range from [0 to Z], where a memory die associated with SCL index value 0 has a lowest relative measured SCL value and a memory die associated with SCL index value Z has a highest relative measured SCL value.

At operation 430, the processing logic identifies, using a die family threshold level, a set of ranges of the ordered SCL index. In an embodiment, the die family threshold level is a percentage of the total set of memory dies (e.g., 100%/N, where N is a number of die families). For example, if the system has 5 die families, the processing logic may apply a die family threshold level of 100%/5 or 20%, such that each die family is assigned an equal number of memory dies. In this example, the processing logic can identify a first range of the set of ranges including a first 20% of the ordered SCL index, a second range of the set of ranges including a second 20% of the ordered SCL index, a third range of the set of ranges including a third 20% of the ordered SCL index, a fourth range of the set of ranges including a fourth 20% of the ordered SCL index, and a fifth range of the set of ranges including a fifth 20% of the ordered SCL index.

At operation 440, the processing logic assigns each range of the set of ranges to a respective die family of a set of die families. In an embodiment, a first range of the set of ranges is assigned to a first die family, a second range of the set of ranges is assigned to a second die family, and so on until all memory dies are assigned to a die family. Advantageously, the assignment of the memory dies to a respective die family of the set of die families is executed based on both a measured SCL value and the die family threshold level. This results in a controllable distribution of memory dies into die families such that under-utilization and over-utilization of die families can be eliminated. In addition, subsequent BFEA processing (e.g., assignment of bin pointers to the established die families) is improved through the generation of die families in accordance with method 400.

Figure 5:
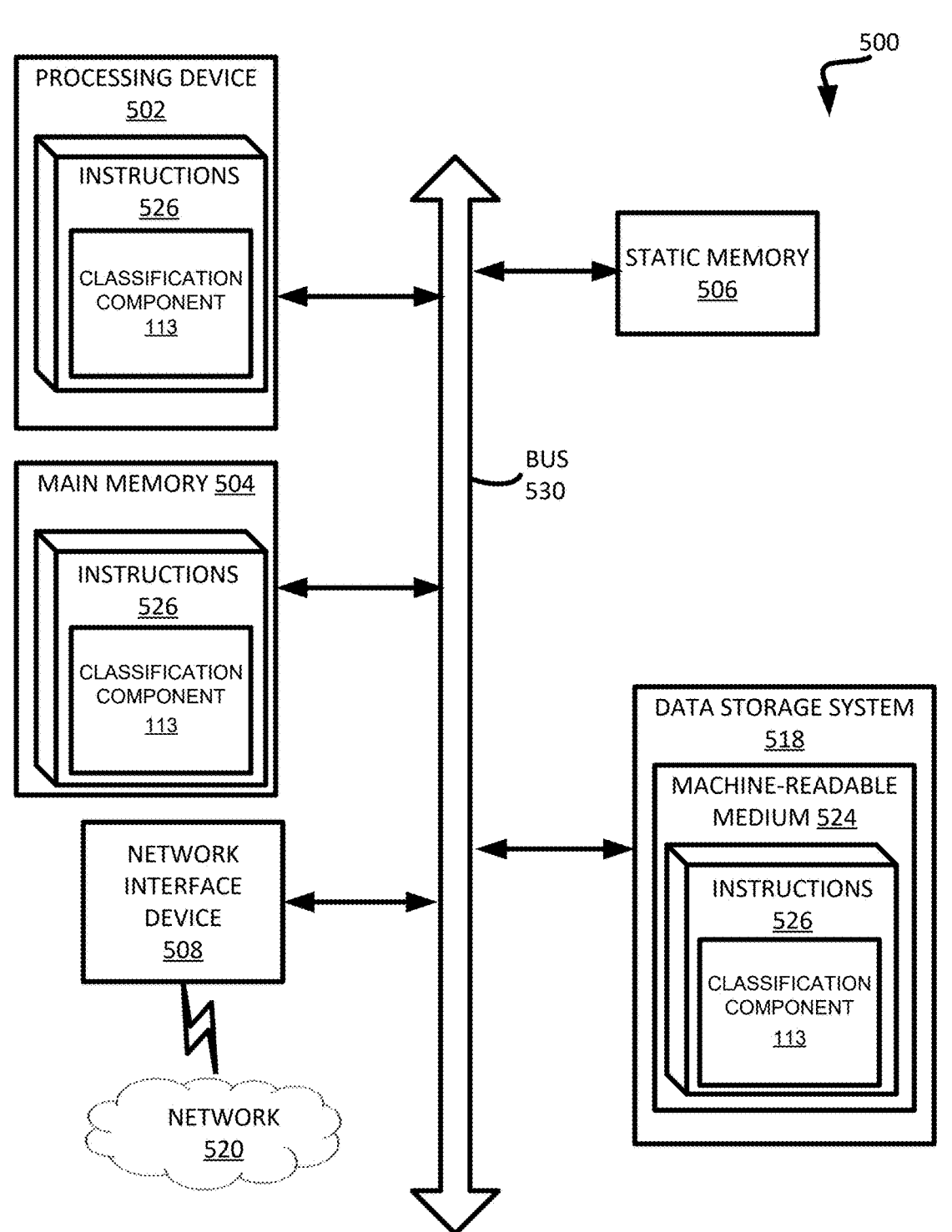
FIG. 5 is a block diagram of an example computer system in which embodiments of the present disclosure may operate.

FIG. 5 illustrates an example machine of a computer system 500 within which a set of instructions, for causing the machine to perform any one or more of the methodologies discussed herein, can be executed. In some implementations, the computer system 500 can correspond to a host system (e.g., the host system 120 of FIG. 1) that includes, is coupled to, or utilizes a memory sub-system (e.g., the memory sub-system 110 of FIG. 1) or can be used to perform the operations of a controller (e.g., to execute an operating system to perform operations corresponding to the die family management component 113 of FIG. 1). In alternative embodiments, the machine can be connected (e.g., networked) to other machines in a LAN, an intranet, an extranet, and/or the Internet. The machine can operate in the capacity of a server or a client machine in client-server network environment, as a peer machine in a peer-to-peer (or distributed) network environment, or as a server or a client machine in a cloud computing infrastructure or environment.

The machine can be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 500 includes a processing device 502, a main memory 504 (e.g., read-only memory (ROM), flash memory, dynamic random access memory (DRAM) such as synchronous DRAM (SDRAM) or Rambus DRAM (RDRAM), etc.), a static memory 506 (e.g., flash memory, static random access memory (SRAM), etc.), and a data storage system 518, which communicate with each other via a bus 530.

Processing device 502 represents one or more general-purpose processing devices such as a microprocessor, a central processing unit, or the like. More particularly, the processing device can be a complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. The processing device 502 is configured to execute instructions 526 for performing the operations and steps discussed herein. The computer system 500 can further include a network interface device 908 to communicate over the network 520.

The data storage system 518 can include a machine-readable storage medium 524 (also known as a computer-readable medium) on which is stored one or more sets of instructions 526 or software embodying any one or more of the methodologies or functions described herein. The instructions 526 can also reside, completely or at least partially, within the main memory 504 and/or within the processing device 502 during execution thereof by the computer system 500, the main memory 504 and the processing device 502 also constituting machine-readable storage media. The machine-readable storage medium 524, data storage system 518, and/or main memory 504 can correspond to the memory sub-system 110 of FIG. 1.

In one embodiment, the instructions 526 include instructions to implement functionality corresponding to die family management component 113 of FIG. 1). While the machine-readable storage medium 524 is shown in an example embodiment to be a single medium, the term "machine-readable storage medium" should be taken to include a single medium or multiple media that store the one or more sets of instructions. The term "machine-readable storage medium" shall also be taken to include any medium that is capable of storing or encoding a set of instructions for execution by the machine and that cause the machine to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. The present disclosure can refer to the action and processes of a computer system, or similar electronic computing device, that manipulates and transforms data represented as physical (electronic) quantities within the computer system's registers and memories into other data similarly represented as physical quantities within the computer system memories or registers or other such information storage systems.

The present disclosure also relates to an apparatus for performing the operations herein. This apparatus can be specially constructed for the intended purposes, or it can include a general purpose computer selectively activated or reconfigured by a computer program stored in the computer. Such a computer program can be stored in a computer readable storage medium, such as, but not limited to, any type of disk including floppy disks, optical disks, CD-ROMs, and magnetic-optical disks, read-only memories (ROMs), random access memories (RAMs), EPROMS, EEPROMs, magnetic or optical cards, or any type of media suitable for storing electronic instructions, each coupled to a computer system bus.

The algorithms and displays presented herein are not inherently related to any particular computer or other apparatus. Various general purpose systems can be used with programs in accordance with the teachings herein, or it can prove convenient to construct a more specialized apparatus to perform the method. The structure for a variety of these systems will appear as set forth in the description below. In addition, the present disclosure is not described with reference to any particular programming language. It will be appreciated that a variety of programming languages can be used to implement the teachings of the disclosure as described herein.

The present disclosure can be provided as a computer program product, or software, that can include a machine-readable medium having stored thereon instructions, which can be used to program a computer system (or other electronic devices) to perform a process according to the present disclosure. A machine-readable medium includes any mechanism for storing information in a form readable by a machine (e.g., a computer). In some implementations, a machine-readable (e.g., computer-readable) medium includes a machine (e.g., a computer) readable storage medium such as a read only memory ("ROM"), random access memory ("RAM"), magnetic disk storage media, optical storage media, flash memory components, etc.

In the foregoing specification, embodiments of the disclosure have been described with reference to specific example embodiments thereof. It will be evident that various modifications can be made thereto without departing from the broader spirit and scope of embodiments of the disclosure as set forth in the following claims. The specification and drawings are, accordingly, to be regarded in an illustrative sense rather than a restrictive sense.

What is claimed is:

1. A method comprising:

measuring, by a controller of a memory sub-system operatively coupled to a set of memory dies, a set of slow charge loss (SCL) values corresponding to the set of memory dies, wherein each SCL value of the set of slow charge loss values corresponds to a memory die of the set of memory dies of the memory sub-system;

generating an ordered SCL index based on the set of SCL values, wherein the ordered SCL index comprises the SCL value for each memory die ranked from a lowest SCL value to a highest SCL value;

identifying, using a die family threshold level comprising a percentage of the set of memory dies, a set of ranges of the ordered SCL index, wherein each range of the set of ranges comprises the percentage of the set of memory dies of the ordered SCL index; and assigning each range of the set of ranges to a corresponding die family of a set of die families.

2. The method of claim 1, wherein the set of SCL values are measured at a time-after-programming point associated with the memory sub-system.

3. The method of claim 1, further comprising assigning a bin pointer associated with a voltage offset bin of a set of voltage offset bins to each die family of the set of die families.

4. A system comprising:

a set of memory dies; and a controller of a memory sub-system, operatively coupled to the set of memory dies, the controller to perform operations comprising:

measuring a set of slow charge loss (SCL) values corresponding to the set of memory dies, wherein each SCL value of the set of slow charge loss values corresponds to a memory die of the set of memory dies of the memory sub-system;

generating an ordered SCL index based on the set of SCL values, wherein the ordered SCL index comprises the SCL value for each memory die ranked from a lowest SCL value to a highest SCL value;

identifying, using a die family threshold level comprising a percentage of the set of memory dies, a set of ranges of the ordered SCL index, wherein each range of the set of ranges comprises the percentage of the set of memory dies of the ordered SCL index; and assigning each range of the set of ranges to a corresponding die family of a set of die families.

5. The system of claim 4, wherein the set of SCL values are measured at a time-after-programming point associated with the memory sub-system.

6. The system of claim 4, the operations further comprising assigning a bin pointer associated with a voltage offset bin of a set of voltage offset bins to each die family of the set of die families.

7. A non-transitory computer-readable storage medium comprising executable instructions that, when executed by a processing device, cause the processing device to perform operations comprising:

measuring a set of slow charge loss (SCL) values corresponding to the set of memory dies, wherein each SCL value of the set of slow charge loss values corresponds to a memory die of the set of memory dies of the memory sub-system;

generating an ordered SCL index based on the set of SCL values, wherein the ordered SCL index comprises the SCL value for each memory die ranked from a lowest SCL value to a highest SCL value;

identifying, using a die family threshold level comprising a percentage of the set of memory dies, a set of ranges of the ordered SCL index, wherein each range of the set of ranges comprises the percentage of the set of memory dies of the ordered SCL index; and assigning each range of the set of ranges to a corresponding die family of a set of die families.

8. The non-transitory computer-readable storage medium of claim 7, wherein the set of SCL values are measured at a time-after-programming point associated with the memory sub-system.

9. The non-transitory computer-readable storage medium of claim 7, wherein each range of the set of ranges comprises an equal portion of the set of memory dies.

* * * * *